United States Patent [19]
Kleijne

[11] Patent Number: 4,593,384
[45] Date of Patent: Jun. 3, 1986

[54] SECURITY DEVICE FOR THE SECURE STORAGE OF SENSITIVE DATA

[75] Inventor: Theodoor A. Kleijne, ZA Dreumel, Netherlands

[73] Assignee: NCR Corporation, Dayton, Ohio

[21] Appl. No.: 684,637

[22] Filed: Dec. 21, 1984

[51] Int. Cl.$^4$ .......................... G11C 7/00; H01L 39/02; H02H 7/20; G06K 19/00

[52] U.S. Cl. .................................... 365/228; 365/218; 357/80; 307/202.1; 235/487; 235/492

[58] Field of Search .................. 365/63, 52, 244, 218; 307/202.1; 340/653, 550, 599, 521; 357/80; 235/487, 492

[56] References Cited

U.S. PATENT DOCUMENTS 3,882,323 5/1975 Smolker .......................... 307/202.1

FOREIGN PATENT DOCUMENTS 3023427 1/1981 Fed. Rep. of Germany .
WO82/02274 7/1982 PCT Int'Appl. .................. 365/218
WO84/04614 11/1984 PCT'Appl. .
1245710 9/1971 United Kingdom .
2077036 12/1981 United Kingdom .

Primary Examiner—Terrell W. Fears
Assistant Examiner—Guy M. Miller
Attorney, Agent, or Firm—Wilbert Hawk, Jr.; Albert L. Sessler, Jr.

[57] ABSTRACT

A device is disclosed for securely housing and protecting microelectronic circuitry in order to prevent external access to sensitive data stored therein. In a preferred embodiment of the invention, the device includes a ceramic housing which encases electronic circuitry. The ceramic housing is comprised of a plurality of individual parts selectively connected together, with each of the parts being comprised of a ceramic substrate and a plurality of ceramic layers disposed thereon. The electronic circuitry includes a memory for storing sensitive data therein and a tamper detection circuit. The tamper detection circuit includes a conductive path selectively provided through the plurality of ceramic layers of each of the plurality of individual parts and is responsive to any attempt to penetrate the ceramic housing which damages the conductive path for clearing the memory of any sensitive data stored therein. The tamper detection circuit further includes a low temperature sensing circuit which is responsive to a decrease in temperature in the ceramic housing below a preselected reference temperature for causing the tamper detection circuit to also clear the memory of any sensitive data stored therein.

18 Claims, 22 Drawing Figures

FIG. 3A  FIG. 3A1
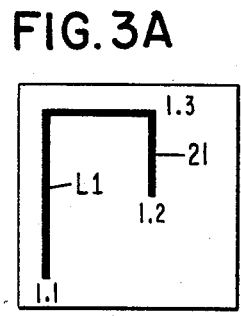 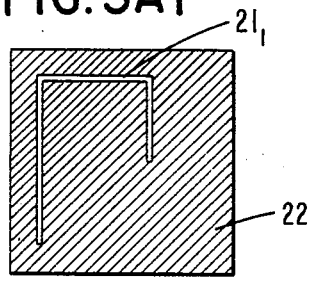
FIG. 3B  FIG. 3B1  FIG. 3B2
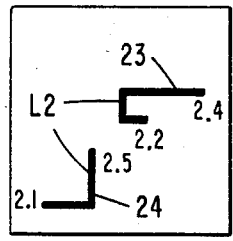 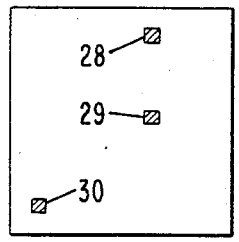 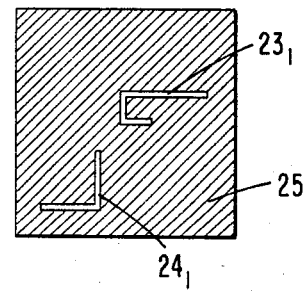
FIG. 3C  FIG. 3C1  FIG. 3C2
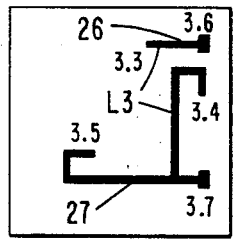 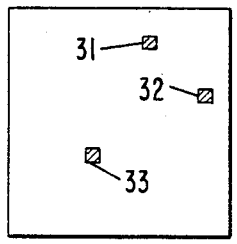 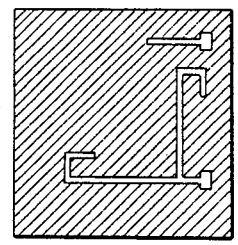

SECURITY DEVICE FOR THE SECURE STORAGE OF SENSITIVE DATA

BACKGROUND OF THE INVENTION

1. Field of the Invention

The present invention relates to various means for housing and protecting microelectronic circuitry in order to prevent external access to sensitive data stored therein.

2. Description of the Prior Art

Several known prior art techniques have been proposed for providing a housing for microelectronic circuitry.

British Patent Specification No. 1,245,710 discloses a case containing a semiconductor integrated element. The case is comprised of a bottom plate, a middle plate and an upper or sealing plate. The integrated element is disposed in a recess in the bottom plate, which bottom plate is comprised of a plurality of ceramic sheets having preselected conductive leads and conducting layers selectively provided thereon. Connections between the paths on the ceramic sheets are selectively made by way of preselected perforated holes through the sheets to the conducting layers and conducting leads. The middle plate is fixed between the bottom plate and the upper or sealing plate to complete the enclosure of the semiconductor integrated elements. The conductive leads are fed out of the case for external connections.

British Patent Specification No. 2,077,036A discloses a multi-layer ceramic package comprised of multi-layers of ceramic substrate on which conductive patterns are selectively placed. The conductive patterns on the various ceramic layers are selectively connected to each other by plated through holes or tunnels. An array of chips, bonded on one of the ceramic substrates, is interconnected by way of wire bondings through lands disposed between and separating the chips.

Neither of the two above-identified British Patent Specification Nos. 1,245,710 and 2,077,036A provides any protection from the unauthorized access of sensitive data that may be stored in the microelectronics circuitry located in its associated housing. To solve this problem, the following known prior art techniques have been proposed.

Ericsson, a company located in Sweden, has proposed a security module to physically protect electronic components, and information stored in such electronic components, from unauthorized analysis and manipulation by physically encapsulating such electronic components. These encapsulated blocks are called Ericsson SEC modules. Ericsson states that such SEC modules effectively protect algorithm sequences, semi-processed data and algorithm keys used in PIN (personal identification number) verification by storing certain information in a volatile RAM (random access memory). Ericsson further states that the encapsulation of the SEC module and a key pad is designed in such a way that it is impossible, even by a combination of chemical and physical attacks, to gain access to the secret data (i.e., algorithm keys) stored in the volatile RAM because this information would be destroyed if the SEC module were attacked.

Further information on the SEC module and how such protection of the secret data is achieved is unavailable to the applicant of the instant invention, since Ericsson has internally classified the design drawings and documentation for the sensitive parts of the SEC module and has only allowed authorized persons to have access to such information.

PCT Application No. WO84/04614 discloses a data security device which includes a closed prestressed glass container within which are a data processor and a volatile memory for storing encryption key data. A power supply for the memory is connected to the memory by way of one or more conductors which wind over the entire inside surface of the closed container. As a result, a breaking into the closed container will break a conductor, removing power from the memory and thereby destroying the data stored in the memory.

German Offenlegungsschrift No. 3,023,427 discloses a secure mobile data storage unit which includes solid state electronic memories contained within a tamper-proof housing and pressure difference sensors built into the housing to detect any unauthorized entry into the housing and to initiate the erasure of data stored in the memories after such detection.

The background art known to applicant at the time of the filing of this application is as follows:

British Patent Specification No. 1,245,710, Case For Containing A Semiconductor Element;

British Patent Specification No. 2,077,036A, Multi-Layer Ceramic Package For Semiconductor Chip;

A publication on the Ericsson SEC module;

PCT Application No. WO84/04614, Data Security Device; and

German Offenlegungsschrift No. 3,023,427, Mobile Data Storage Unit.

SUMMARY OF THE INVENTION

Briefly, a device is disclosed for providing secure storage of sensitive data and preventing any attempt to read that sensitive data out after it has been stored.

In accordance with one aspect of the invention, there is provided a device for the secure storage of sensitive data, said device comprising, in combination, a housing; a memory contained within said housing for storing sensitive data therein; low temperature sensing means contained within said housing and being responsive to a decrease in temperature in said housing below a preselected reference temperature for developing a first signal; and means contained within said housing being responsive to said first signal for clearing said memory of any sensitive data stored therein.

In accordance with another aspect of the invention, there is provided a device for the secure storage of sensitive data, said device comprising, in combination, a ceramic housing comprised of a plurality of individual parts selectively connected together, each of said parts being comprised of a ceramic substrate and a plurality of ceramic layers disposed thereon; and electronic circuitry contained within said ceramic housing, said electronic circuitry including a memory for storing sensitive data therein and a tamper detection circuit, said tamper detection circuit including a first conductive path selectively provided through said plurality of ceramic layers of each of said plurality of individual parts, said tamper detection circuit being responsive to any attempt to penetrate said ceramic housing which damages said first conductive path for clearing said memory of any sensitive data stored therein.

In accordance with another aspect of the invention, there is provided a device for the secure storage of sensitive data, said device comprising in combination, a ceramic housing comprised of a plurality of individual parts selectively connected together into a preselected configuration, each of said parts being comprised of a ceramic substrate and a plurality of ceramic layers disposed thereon; a memory contained within said ceramic housing for storing sensitive data therein; a first conductive path selectively provided through said plurality of ceramic layers of each of said plurality of individual parts; sensing means contained within said ceramic housing and being coupled to said first conductive path, said sensing means being responsive to any attempt to penetrate said ceramic housing which damages said first conductive path for generating a first signal; and means contained within said ceramic housing being responsive to said first signal for clearing said memory of any sensitive data stored therein.

BRIEF DESCRIPTION OF THE DRAWINGS

Various objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIGS. 3A, 3A1, 3B, 3B1, 3B2, 3C, 3C1, 3C2 and 3D are exemplary illustrations of how three conductive layers separated by two insulating layers are selectively deposited on a ceramic substrate and connected together to form any one of the parts P1-P6 of FIG. 2;

DESCRIPTION OF THE PREFERRED EMBODIMENT

Figure 1:
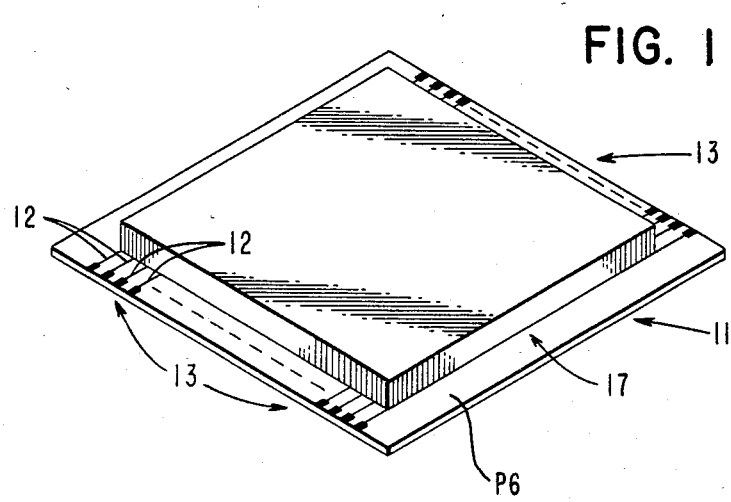
FIG. 1 is an illustration of the assembled device or module of the invention.

Referring now to the drawings, FIG. 1 illustrates an exemplary form of a security device 11 of the invention. A plurality of conductors 12 connected to a plurality of pins 13 are shown on both sides of a bottom part P6 of a housing 17 of the device 11 for connecting the device 11 to external electronic equipment (not shown). The housing 17 is preferably comprised of ceramic, since a ceramic housing cannot be penetrated by chemicals due to the fact ceramic will not dissolve.

Figure 2:
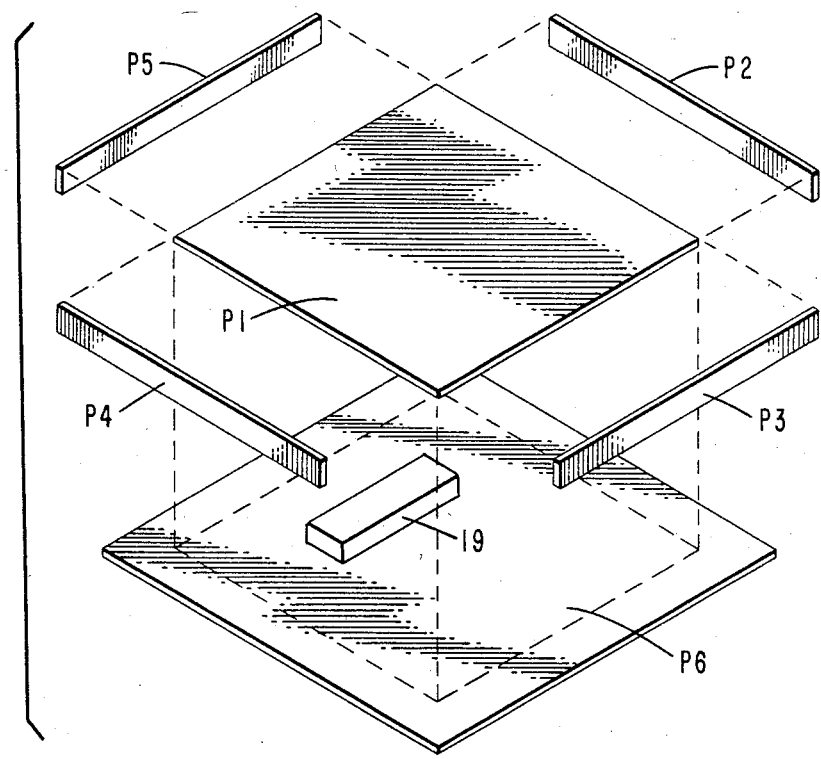
FIG. 2 is an exploded perspective view of the various parts of the housing of the device of FIG. 1.

An exploded perspective view of the various parts of the housing 17 of the device 11 is illustrated in FIG. 2. As shown, the housing 17 is comprised of a top part or cover P1, side parts P2 through P5 and a bottom part P6. Coupled to the bottom part P6 by way of surface mounting pins (not shown) is electronic circuitry 19 which is encased within the housing 17 for security and protection.

Each of the parts P1-P6 is comprised of a ceramic substrate having three conductive layers separated by two nonconductive or insulating layers, with all layers being deposited on the ceramic substrate by a conventional screening technique using conventional thick film techniques. FIGS. 3A, 3A1, 3B, 3B1, 3B2, 3C, 3C1, 3C2 and 3D illustrate how three conductive layers separated by two insulating layers are selectively deposited on a ceramic substrate and connected together to form any one of the parts P1-P6.

Figure 3D:
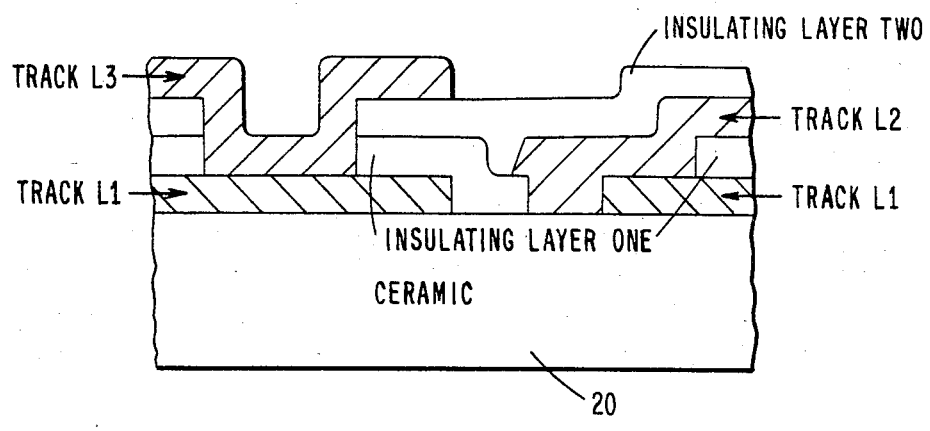

Screens (FIGS. 3A1, 3B1, 3B2, 3C1 and 3C2) with very small holes (where the diameter of a hole may be equal to approximately 300 micrometers) are used to deposit conductive or insulating paste on a ceramic substrate 20 (FIG. 3D). For every conductive layer and insulating layer a different screen is prepared. After each screening the layered ceramic part 20 is heated up to 800 degrees centigrade to harden the just deposited paste.

FIG. 3A illustrates the first conductive layer L1 to be deposited on the ceramic substrate 20. As shown in FIG. 3A, L1 is comprised of one track 21. FIG. 3A1 illustrates the screen that is placed on the ceramic substrate 20 and used to deposit the layer L1 on the ceramic substrate 20. The screen of FIG. 3A1 is the negative of the required layer L1. The shaded area 22 in FIG. 3A1 is blocked off with a polymer (not shown) so that a conductive paste (not shown) can only pass through an open area $21_1$ to form the track 21 of the layer L1 on the ceramic substrate 20. Layer L1 is then hardened at 800 degrees centigrade in an oven. The thickness of the track 21 of layer L1 is about 10 micrometers.

Points or areas 1.1, 1.2 and 1.3 on layer L1 of FIG. 3A are then blocked off with a polymer at the respective hole positions 30, 29 and 28 of the screen shown in FIG. 3B1, because these areas have to be selectively connected later to subsequently laid conductive layers (L2 and L3). Insulating paste is now screened over the assembly of FIG. 3A to form an insulating layer one (FIG. 3B1) and the now insulated assembly of FIG. 3A is heated up again to 800 degrees centigrade to harden it.

FIG. 3B illustrates the second conductive layer (L2) to be deposited on the hardened assembly of FIG. 3A by using the screen shown in FIG. 3B2. As shown in FIG. 3B layer L2 is comprised of two tracks 23 and 24. The screen of FIG. 3B2 is the negative of the pattern of FIG. 3B. The shaded area 25 of FIG. 3B2 is blocked off again with a polymer. After screening with conductive paste through open areas $23_1$ and $24_1$ of the screen of FIG. 3B2 and heating the hardened assembly of FIG. 3B, connections are made between points 1.1 of FIG. 3A and 2.1 of FIG. 3B by way of the hole 30 in insulating layer one of FIG. 3B1 and between points 1.2 of FIG. 3A and 2.2 of FIG. 3B by way of the hole 29 in insulating layer one of FIG. 3B1. Note that the track 23 of FIG. 3B crosses over the track 21 of FIG. 3A.

Insulating layer two (FIG. 3C1) is needed to enable the deposition of the third conductive layer L3. The laying of these two layers is accomplished by using the screens of FIGS. 3C1 and 3C2 in a manner similar to that previously described with respect to FIG. 3B1. More specifically, hole positions 31, 32 and 33 of the screen shown in FIG. 3C1 are blocked off with a polymer before insulating layer two is deposited. When the polymer is removed from the insulating layer two (as is similarly done with insulating layer one), holes 31, 32 and 33 are left in the insulating layer two, as indicated in FIG. 3C1. Then conducting layer L3 is laid or deposited through the screen shown in FIG. 3C2. After the insulating layer two and layer L3 are laid or deposited, the pattern of L3 results, as shown in FIG. 3C. As shown in FIG. 3C, L3 is comprised of two tracks 26 and 27 which are respectively connected to square islands 3.6 and 3.7. Island 3.6 in layer L3 of FIG. 3C is connected via point 3.3 in layer L3 of FIG. 3C to point 1.3 of L1 in FIG. 3A through the hole 31 in insulating layer two and the hole 28 in insulating layer one. On the other hand, island 3.7 in layer L3 of FIG. 3C is connected via point 3.5 in layer L3 of FIG. 3C to point 2.5 in layer L2 of FIG. 3B by way of hole 33 in insulating layer two (FIG. 3C1). In addition, island 3.7 in layer L3 of FIG. 3C is also connected via point 3.4 in layer L3 to point 2.4 in layer L2 of FIG. 3B by way of hole 32 in insulating layer two (FIG. 3C1).

FIG. 3D illustrates a sectional view of connections between layers or tracks L3 and L1 and between layers or tracks L2 and L1. The ceramic substrate 20 is approximately 700 micrometers thick and each of the conductive and insulating layers is only about 10 micrometers thick. The width of each of the tracks L1, L2 and L3 is about 300 micrometers.

The conductive layers or tracks L1, L2 and L3 are selectively connected together at preselected islands or connection points. For example, the point 3.5 and island 3.6 of conductive layer L3 of FIG. 3C are respectively connected to point 2.5 in conductive layer L2 of FIG. 3B and to point 1.3 in conductive layer L1 of FIG. 3A by means of conductive epoxy through the hole 33 (FIGS. 3C1) and the holes 31 and 28 (FIGS. 3C1 and 3B1), respectively. The assembly of FIG. 3D (comprises of the layer of FIGS. 3C, 3C1, 3B, 3B1, and 3A) is then put into an oven (not shown) and heated to about 800 degrees C. for the proper duration of time in order to harden the conductive layer 3 and the conductive epoxy.

Referring now back to FIG. 2, the parts P1-P6 are assembled together into the housing 17 of FIG. 1 in the following manner. Initially the top part P1 is sequentially glued to side parts P2-P5. First, exposed islands on part P2 are respectively electrically connected to associated exposed islands on part P1 with conductive epoxy. In a similar manner, exposed islands on part P3 are respectively electrically connected to associated exposed islands on part P1 with conductive epoxy; exposed islands on part P4 are respectively electrically connected to associated exposed islands on part P1 with conductive epoxy; and exposed islands on part P5 are respectively electrically connected to associated exposed islands on part P1 with conductive epoxy. Conductive epoxy is next placed on the remaining exposed islands on the assembly of parts P1-P5. Then the assembly of parts P1-P5 is properly oriented with respect to part P6 and gently placed onto part P6 to electrically connect the remaining islands on part P6 with the remaining unconnected islands on the assembly of parts P1-P5. After the assembly of parts P1-P6 is electrically connected together at associated islands to form the housing 17 (FIG. 1), as described above, nonconductive epoxy is applied along the lines between adjacent pairs of the parts P1-P6 to seal any gaps between adjacent pairs of the parts P1-P6 and to provide additional strength for the housing 17.

Figure 4:
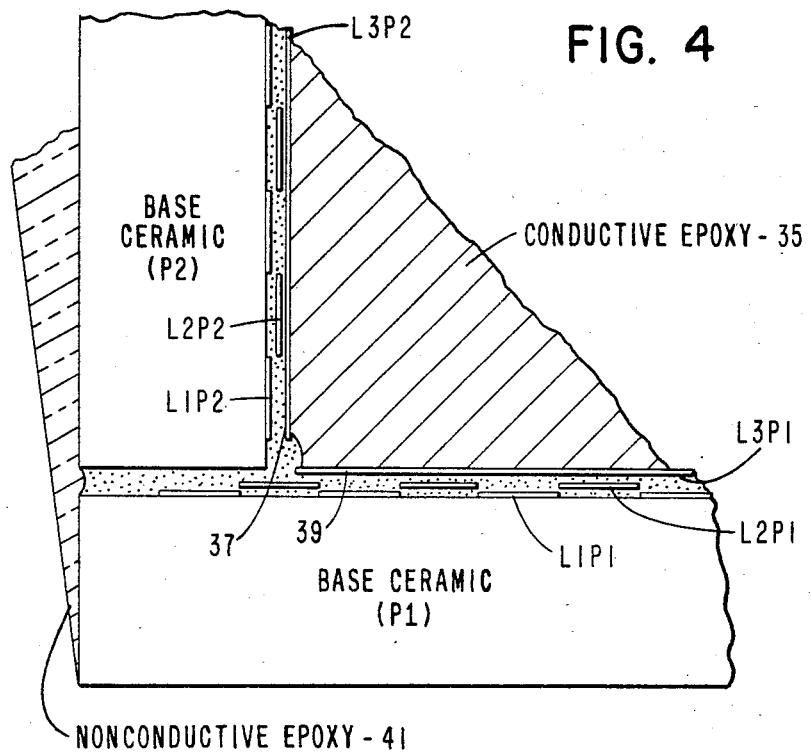
FIG. 4 is a partial sectional view of the housing 17 of FIG. 1.

FIG. 4 is a partial sectional view of the completed housing 17 showing the connection of an island 37 on layer 3 of part 2 (L3P2) with an island 39 on layer 3 of part 1 (L3P1) by means of conductive epoxy 35, and the further gluing of the parts P1 and P2 together with nonconductive epoxy 41.

An additional layer of ceramic (not shown) is mounted onto the bottom part P6 to hold the electronic circuitry 19. The electronic circuitry 19 is then mounted onto this additional layer of ceramic by way of surface mounting pins (not shown). Any necessary contacts between the conductive layer 3 and the electronic circuitry 19 are connected together with surface mounting pins (not shown). Then the assembled structure of parts P1-P5 is glued to bottom part P6, with the associated exposed islands between the assembly of parts P1-P5 and the bottom part P6 being connected together with conductive epoxy before the entire assembly of parts P1-P6 is sealed all over with nonconductive epoxy, as discussed before. As mentioned before, the plurality of leads 12 and plurality of contacts 13 (shown in FIG. 1) are all on part P6.

Figure 8:
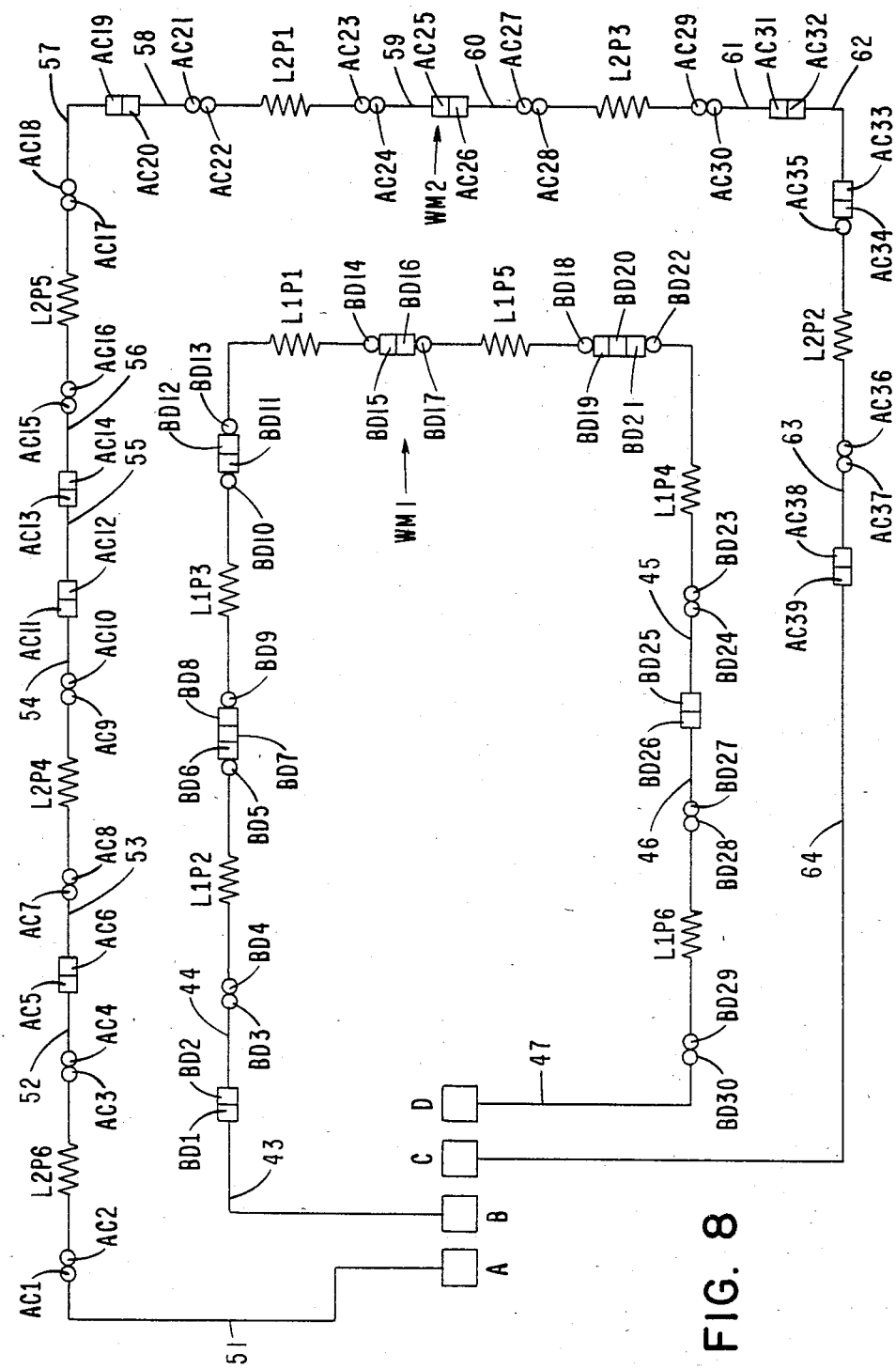
FIG. 8 shows the connections of the conductive paths in FIGS. 7A and 7B by way of preselected connections and islands in FIGS. 5A and 5B to form a first conductive path designated as WMI, and further shows the connections of the conductive paths in FIGS. 6A and 6B by way of preselected connections and islands in FIGS. 5A and 5B to form a second conductive path designated as WM2.

The formation of first and second continuous conductive paths WM1 (wire mesh 1) and WM2 (wire mesh 2) through the parts P1-P6 of the ceramic housing 17 (FIG. 1) as shown in FIG. 8 (as well as in FIGS. 9 and 11) will be explained by now referring to FIGS. 5A, 5B, 6A, 6B, 7A, 7B and 8.

Figure 5A:
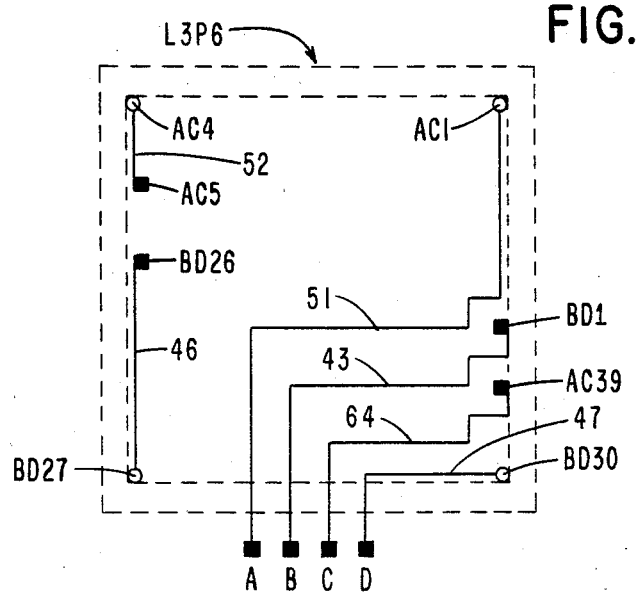
FIGS. 5A and 5B together show the islands and conductive paths in conductive layer 3 for each of the parts shown in FIG. 2.
Figure 5B:
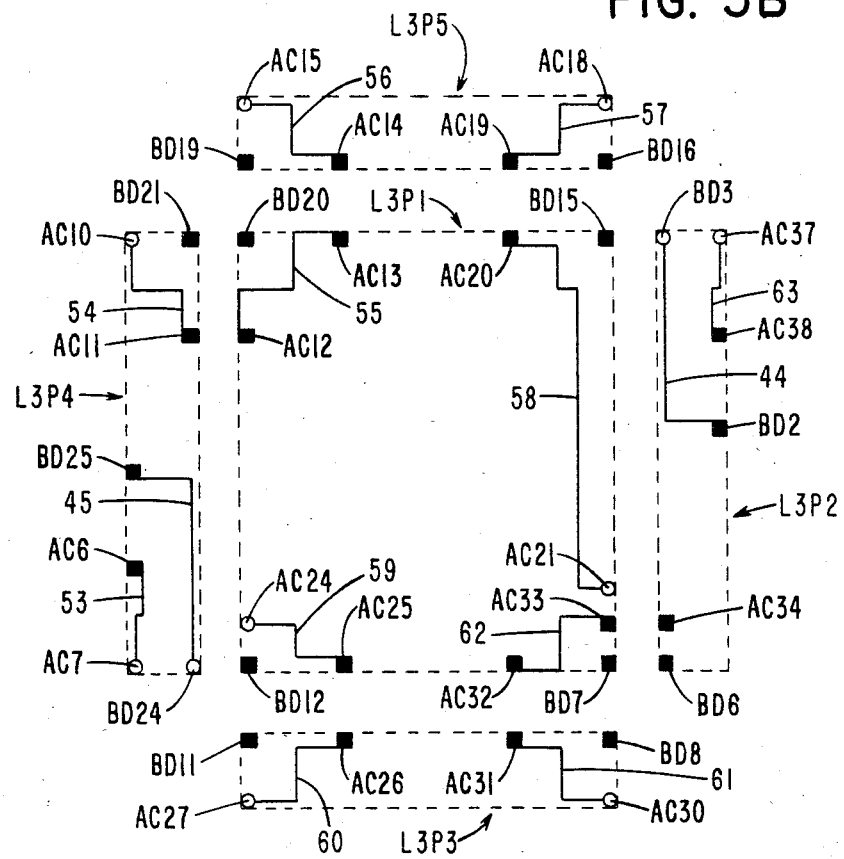
Figure 6A:
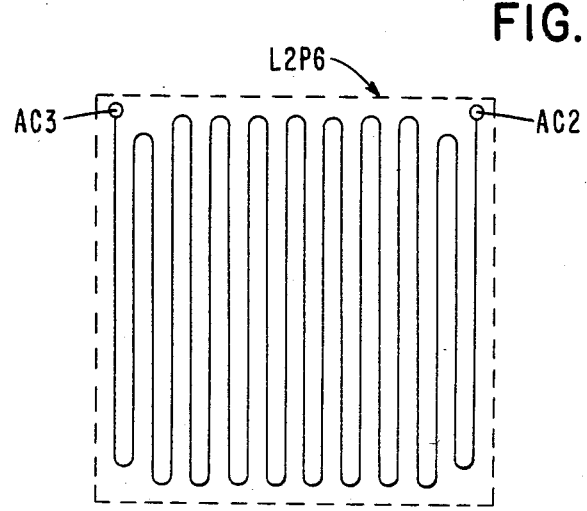
FIGS. 6A and 6B together show the conductive paths in conductive layer 2 for each of the parts shown in FIG. 2.
Figure 6B:
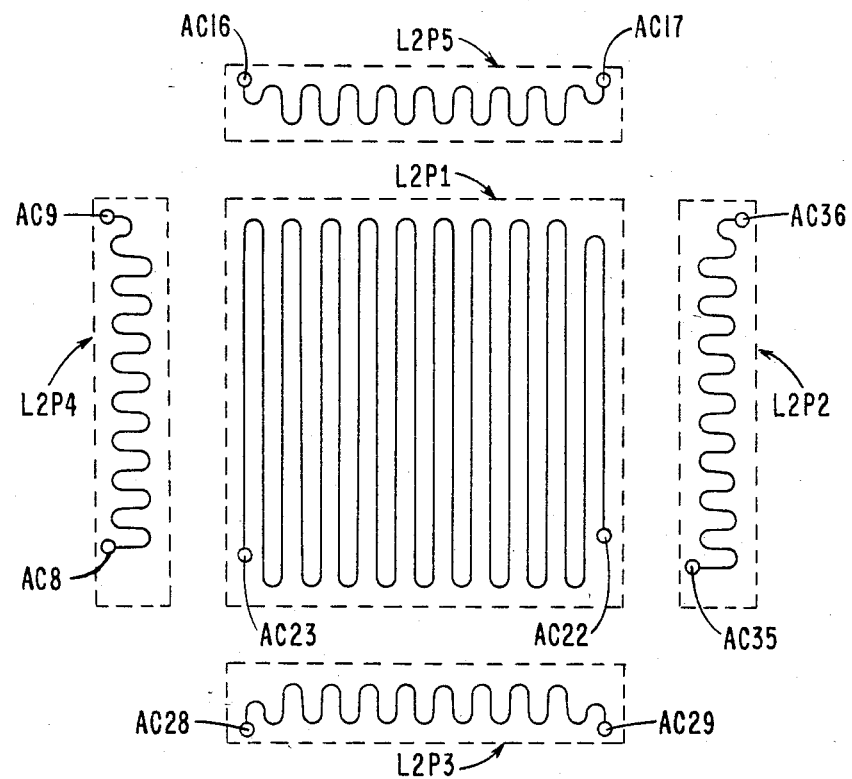
Figure 7A:
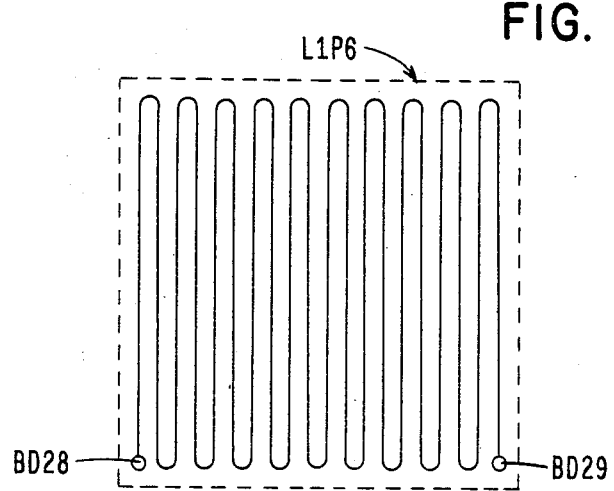
FIGS. 7A and 7B together show the conductive paths in conductive layer 1 for each of the parts shown in FIG. 2.
Figure 7B:
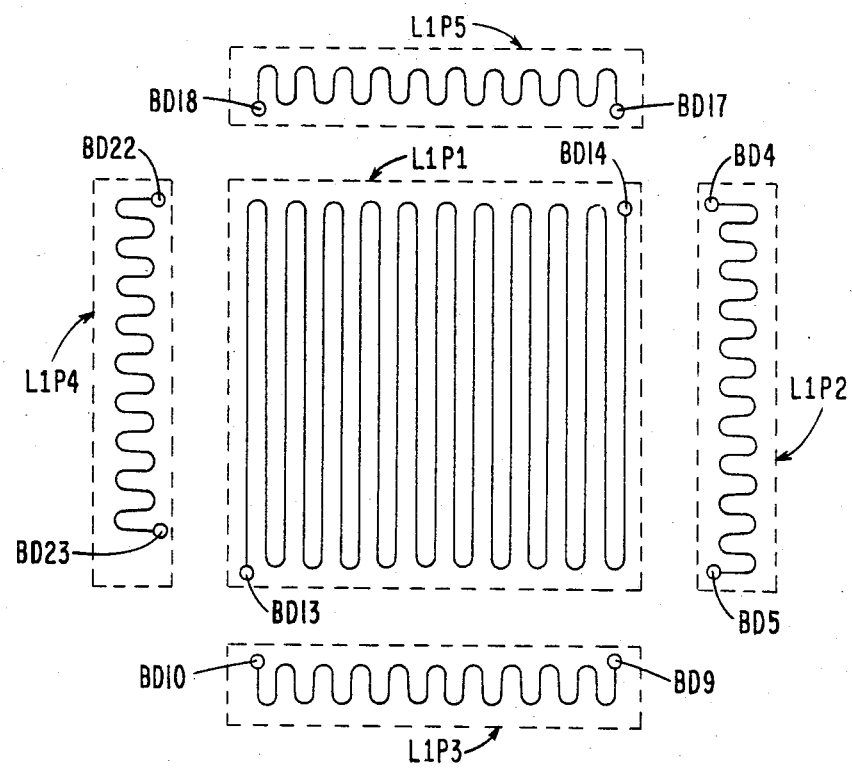

FIGS. 5A and 5B together show the islands and conductive paths in conductive layer 3 (L3) for each of the parts P1-P6 shown in FIG. 2. The FIGS. 6A and 6B together show the conductive paths in conductive layer 2 (L2) for each of the parts P1-P6 shown in FIG. 2. Similarly, FIGS. 7A and 7B together show the conductive paths in conductive layer 1 (L1) for each of the parts P1-P6 shown in FIG. 2. Finally, FIG. 8 shows the connections of the conductive paths in FIGS. 7A and 7B by way of preselected connections and islands in FIGS. 5A and 5B to form the first continuous conductive path WM1 and also shows the connections of the conductive paths in FIGS. 6A and 6B by way of preselected connections and islands in FIGS. 5A and 5B to form the second continuous conductive path WM2.

As shown in FIGS. 5B and 8, pins A and C are respectively the input and output pins of WM2. Similarly, pins B and D are respectively the input and output pins of WM1. These pins A, B, C and D are internally connected to leads (not shown) which are coupled through surface mounting pins (not shown) to the group of pins 13 (FIG. 1).

The alphanumerically identified squares in FIGS. 5A and 5B (such as BD1 in FIG. 5A) represent islands to be connected, while the alphanumerically identified circles in FIGS. 5A, 5B, 6A, 6B, 7A and 7B (such as AC1 in FIG. 5A) represent connection points.

By using FIG. 8 as a guide it can be readily seen in FIGS. 5A, 5B, 7A and 7B that the line BD (or continuous conductive path WM1) from pin B (FIG. 5A) to pin D (FIG. 5A) sequentially passes through a zig-zag conductive path through the conductive layers L1P2 (FIG. 7B), L1P3 (FIG. 7B), L1P1 (FIG. 7B), L1P5 (FIG. 7B), L1P4 (FIG. 7B) and L1P6 (FIG. 7A) via the islands and connection points BD1-BD30 and lines 43-47. Similarly, by using FIG. 8 as a guide, it can be readily seen in FIGS. 5A, 5B, 6A and 6B that the line AC (or continuous conductive path WM2) from pin A (FIG. 5A) to pin C (FIG. 5A) sequentially passes through a zig-zag conductive path through the conductive layers L2P6 (FIG. 6A), L2P4 (FIG. 6B), L2P5 (FIG. 6B), L2P1 (FIG. 6B), L2P3 (FIG. 6B) and L2P2 (FIG. 6B) via the islands and connection points AC1-AC39 and lines 51-64.

Figure 9:
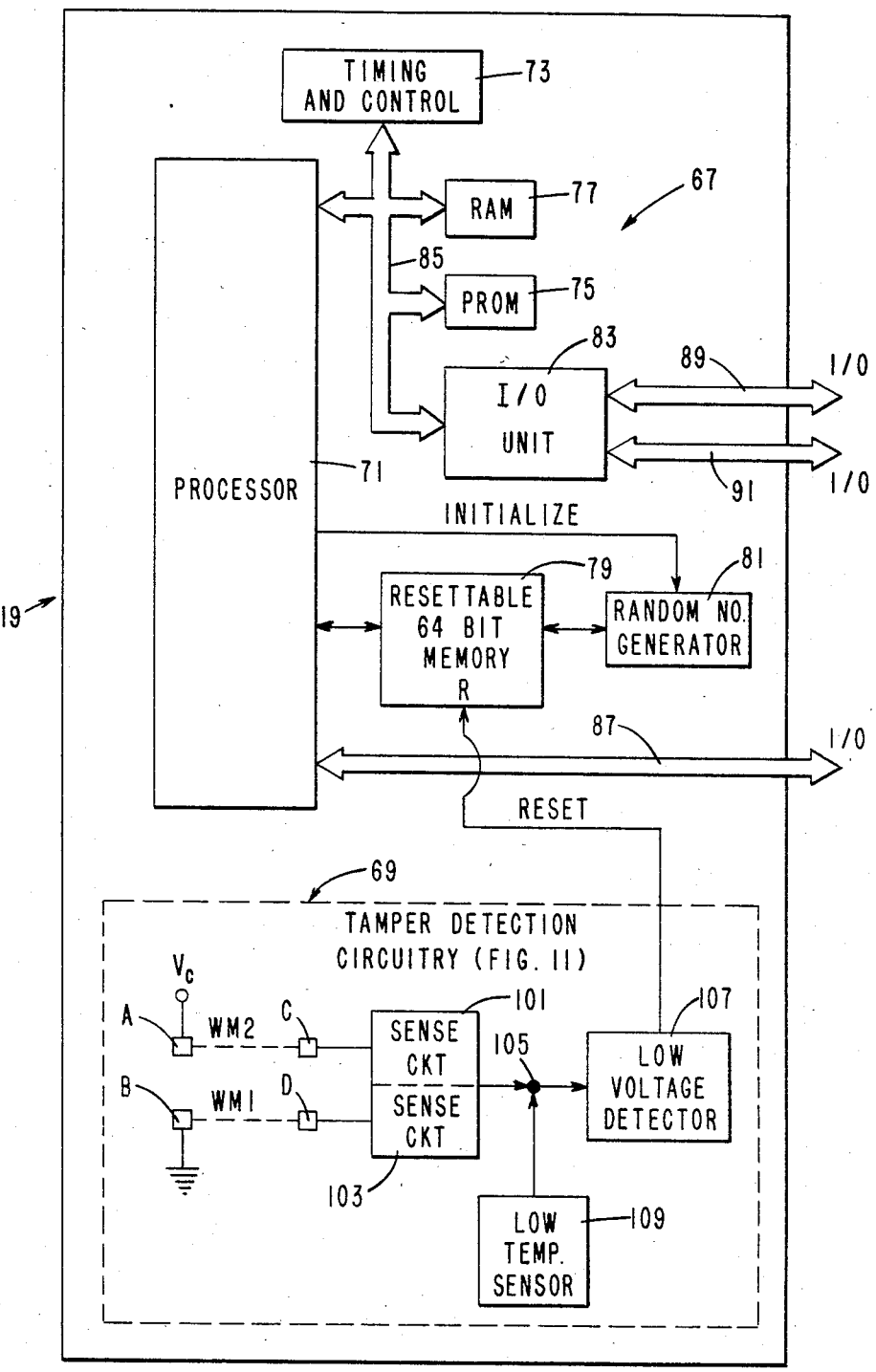
FIG. 9 is a schematic block diagram of the electronic circuitry contained within the device of FIG. 1.

Referring to FIG. 9, the electronic circuitry 19 of FIG. 2 will now be discussed in more detail. The electronic circuitry 19 includes data processing circuitry 67 and tamper detection circuitry 69.

The data processing circuitry 67 can be utilized to perform any desired data processing operation in such applications as, for example, electronic payment systems, electronic fund transfers, data encryption/decryption, PIN (personal identification number) verification, data transmission/reception, access control and home banking. The data processing circuitry 67 includes a processor 71 for selectively controlling the operation of the electronic circuitry 19 in response to input data and instructions, a timing and control circuit 73 for controlling the operation of the processor 71, a programmable read only memory (PROM) 75 for storing the software program to be executed by the processor 71, a random access memory (RAM) 77 for providing a temporary memory storage, a volatile or reset-table 64 bit shift regitster memory 79 for permanently storing the most sensitive or secure data such as a key storage key (KSK) (to be explained), a random number generator 81 and an input/output (I/O) unit 83.

A data, control and address bus 85, bidirectional I/O bus 87 and I/O lines 89 and 91 are coupled to the processor 71, timing and control circuit 73, PROM 75, RAM 77 and I/O unit 83 to enable the data processing circuitry 67 to perform its data processing operations. Data may be passed over bidirectional I/O bus 87 to or from the processor 71 and over I/O lines 89 and 91 to or from the I/O unit 83. The right-hand ends of the I/O bus 87 and I/O lines 89 and 91 (as shown in FIG. 9) may be selectively coupled to, for example, another data processor (not shown), a main computer (not shown) and a peripheral (such as a keyboard) (not shown) via the pins 13 (FIG. 1) in order to enable the data processing circuitry 67 to perform its preselected operations.

Power to operate the electronic circuitry 19 is preferably supplied from external power sources (not shown), such as power supplies and batteries, connected to preselected ones of the pins 13 (FIG. 1).

An initialization subroutine, contained in the software program stored in the PROM 75, is executed in a special mode of operation controlled by an authorized person. Preferably, this initialization subroutine can only be executed once after the security device 11 (FIG. 1) has been completely assembled.

For purposes of additional security it is preferable that the volatile memory 79 be, for example, a resettable memory such as a 64-bit shift register memory.

Figure 10:
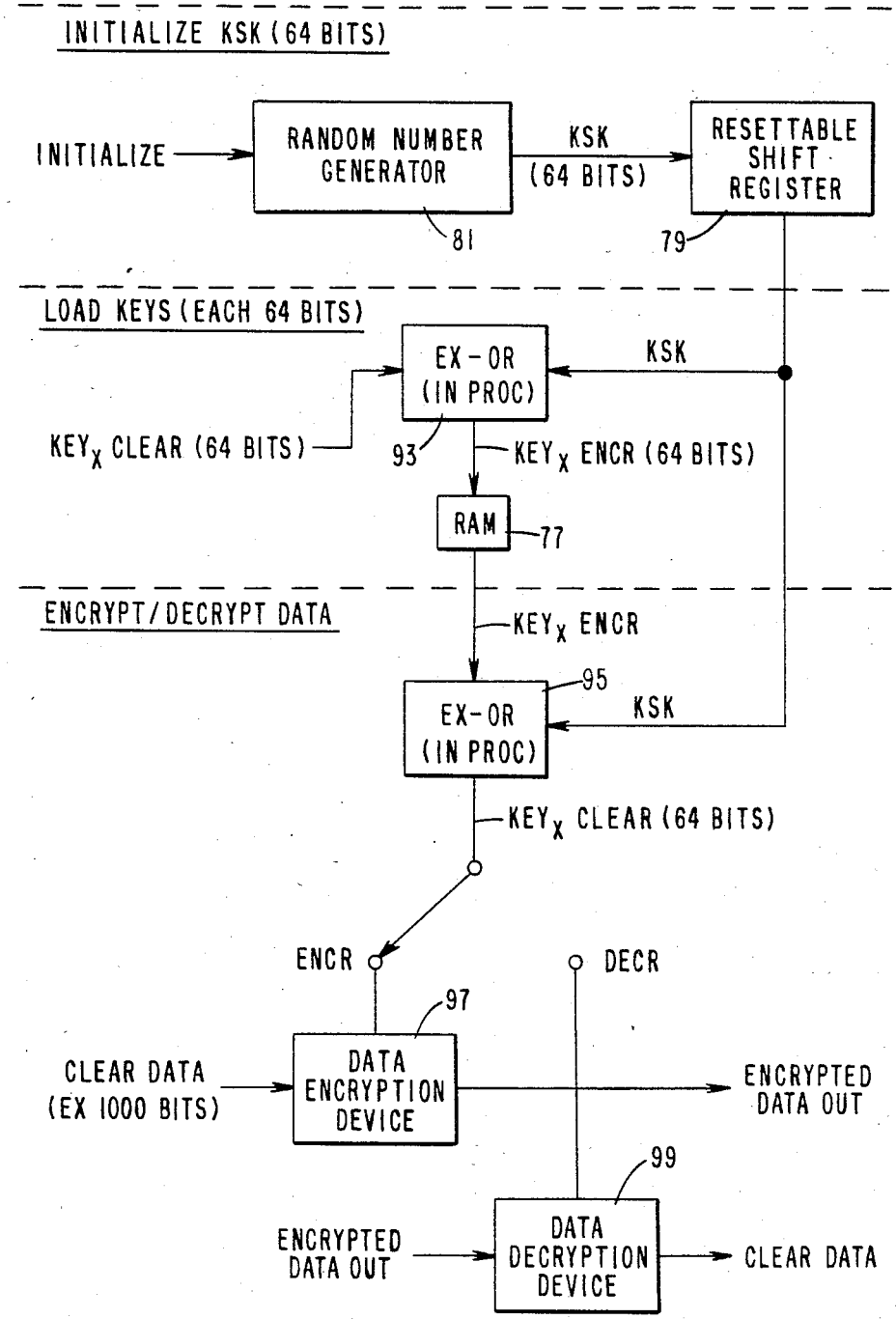
FIG. 10 is a functional block diagram illustrating how the key storage key (KSK) is generated and how the KSK is utilized in loading KEYS and in encrypting and decrypting data.

During the execution of an INITIALIZE subroutine the processor 71 applies an INITIALIZE signal to the random number generator 81 to enable the generator 81 to generate a random number which is stored in the memory 79 as an exemplary sequence of 64 random bits. This sequence of 64 random bits is the KSK (key storage key), which is the most sensitive or secure data contained in the data processing circuitry 67. Referring to the functional block diagram of FIG. 10, it will now be explained how the sensitive KSK data is generated and then utilized by the data processing circuitry 67 in the loading or storage of subsequently entered KEYS and in all subsequent encryption and decryption operations of output and input data, respectively.

INITIALIZE KSK

In response to the INITIALIZE signal from the processor 71, the random number generator 81 generates the random 64-bit KSK. This KSK is then permanently stored in the resettable shift register memory 79. The invention prevents this KSK from being externally accessed.

LOAD KEYS

After KSK has been generated, a person can store 64-bit KEYS in the RAM 77. Each KEY to be entered is an exemplary sequence of 64 bits of clear data (hereinafter designated as $KEY_X$ CLEAR) that can be entered into the data processing circuitry 67 by way of, for example, a keyboard (not shown) connected to pins 13 (FIG. 1). For added security each $KEY_X$ CLEAR is encrypted with KSK by exclusive-ORing them together in an exclusive-OR (EX-OR) gate 93 to develop a $KEY_X$ ENCR signal that is also 64 bits in length. This $KEY_X$ ENCR signal is then stored in the RAM 77.

ENCRYPT/DECRYPT DATA

To encrypt outgoing clear data or decrypt incoming encrypted data, a desired $KEY_X$ ENCR signal is extracted from the RAM 77 while the KSK is extracted from the resettable shift register 79 by well-known read-out techniques. The $KEY_X$ ENCR signal and the KSK are then exclusive-ORed together in an EX-OR gate 95 to recover the associated $KEY_X$ CLEAR signal.

In a data encryption operation, the $KEY_X$ CLEAR signal is routed to a data encryption device 97 where it is used to encrypt clear data entered into the data processing circuitry 67 (FIG. 9) by way of one of the I/O buses 87, 89 and 91. Encrypted data from the device 97 is then outputted from the security device 11 (FIG. 1) by way of the pins 13 (FIG. 1).

In a data decryption operation, encrypted data entered into the data processing circuitry 67 (FIG. 9) by way of the pins 13 (FIG. 1) is applied to a data decryption device 99. The $KEY_X$ CLEAR signal, which is routed from the EX-OR gate 95 to the data decryption device 99, is used by the data decryption device 99 to develop clear data which can then be utilized by the data processing circuit 67.

The EX-OR gates 93 and 95, the data encryption device 97 and the data decryption device 99 can be implemented in hardware or the operations performed by those units can be performed as a function of software subroutines of the program contained in the PROM 75.

Referring back to FIG. 9, it should be noted that the above-described implementation for generating the KSK is for illustrative purposes only and does not form any part of the invention. Any other suitable implementation could therefore be used to generate the KSK. The important things to consider are that the resettable memory 79 stores the KSK, that the contents of the memory 79 cannot be altered, (if the security device 11 was programmed to run the initialization program only once), that the KSK is never outputted to the outside world from the security device 11, and that for purposes of security external access to the KSK contents of the memory 79 by various means must be prevented.

Tamper detection circuitry 69 is included in the electronic circuitry 19 to specifically actively destroy the KSK in the resettable memory 79 if there is any attempt to penetrate the ceramic housing 17 to gain access to the KSK stored in the memory 79. It should be realized that if the KSK is destroyed, any data stored in RAM 77 becomes meaningless or useless. Two principal ways that someone could employ to attempt to gain access to the KSK stored in the resettable memory 79, as well as the reaction of the tamper detection circuitry 69 to such attempts, are discussed below.

ATTEMPT TO BREAK INTO HOUSING 17

An attempt to penetrate the ceramic housing 17 may be made by drilling into or cracking the housing 17. To protect against this possibility, wire mesh 2 (WM2) of FIG. 8 is connected between a supply voltage $V_C$ and a sense circuit 101, while wire mesh 1 (WM1) of FIG. 8 is connected between a reference potential such as ground and a sense circuit 103. It will be recalled that WM1 and WM2 are different conductive paths on different levels or layers of each of the parts P1-P6 of the housing 17, as shown in FIGS. 1-8.

An attempt to drill into or crack the housing 17 that damages either or both of WM1 and WM2 will be readily sensed. If WM2 is broken or shorted to either WM1 or ground by such an attempt, sense circuit 101 will generate a low voltage signal at point 105. Similarly, if WM1 is broken or shorted to either WM2 or $V_C$ by such an attempt, the sense circuit will generate a low voltage signal at point 105. In response to a low voltage signal at point 105, a low voltage detector 107 generates a RESET signal which resets the memory 79 to actively clear or destroy the KSK in the resettable memory 79.

ATTEMPT TO FREEZE KSK CONTENT OF MEMORY 79 BEFORE BREAKING INTO HOUSING 17

It is known that it is possible to retain data in static CMOS cells of a memory in an unpowered state (no supply voltage or battery voltage present), if those cells are initially frozen below −90 degrees centigrade before power is removed from the memory.

A low temperature sensor 109 is therefore needed in the tamper detection circuitry 69 to protect the security device 11 (FIG. 1) against the above-described tampering at extremely low temperatures. The sensor 109 is also connected to point 105. Sensor 109 is so implemented that when the temperature within the housing 17 (FIG. 1) falls to, for example, −25 degrees centigrade, the sensor 109 generates and applies a low voltage signal to point 105. This low voltage signal applied from sensor 109 to point 105 will also cause the low voltage detector 107 to generate a RESET signal to reset the memory 79 to actively clear or destroy the KSK in the memory 79.

Figure 11:
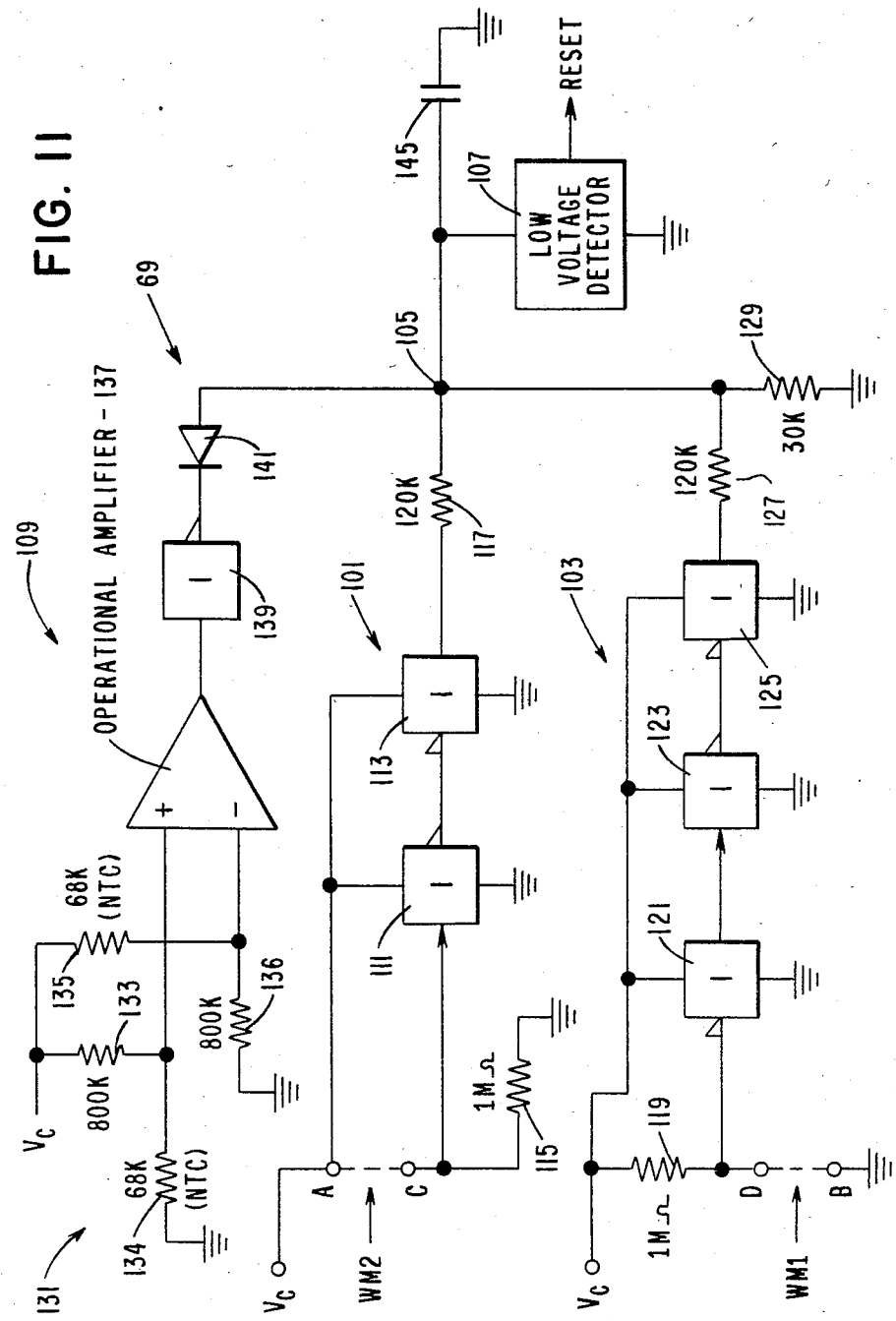
FIG. 11 is a schematic block diagram of the tamper detection circuitry of FIG. 9.

Referring now to FIG. 11, the tamper detection circuitry 69 will be described in more detail.

The tamper detection circuitry 69 is essentially comprised of four parts. A first part includes WM2 and sense circuit 101. A second part includes WM1 and sense circuit 103. A third part includes the low temperature sensor 109. All of the first, second and third parts are connected to a common output at point 105 which, in turn, is connected to the fourth part which includes the low voltage detector 107. Consequently, if any of the first, second or third parts detects any attempt to gain access to the KSK in memory 79 (FIG. 9) a low output is developed at point 105. As mentioned before, such a low output at point 105 will cause the low voltage detector 107 to actively reset the memory 79 to destroy the KSK stored therein.

In the first part, pin C of WM2 is coupled to sense circuit 101. A high or positive supply voltage $V_C$ is applied to pin A of WM2 and to each of cascaded inverters 111 and 113 in sense circuit 101. For purposes of this discussion assume that $V_C = +4.5$ volts. A one megohm (1MΩ) resistor 115 is connected between pin C of WM2 and a low reference potential such as ground. Pin C is also connected to the input of inverter 111. The output of inverter 113 is applied through a 120 kilohm resistor 117 to point 105.

When WM2 is undamaged (not broken or shorted to either ground or WM1), the input to inverter 111 is high, the output of inverter 111 is low and the output of inverter 113 is high.

In the second part, pin D of WM1 is coupled to sense circuit 103 and pin B of WM1 is connected to the low reference potential or ground. A one megohm resistor 119 is connected between pin D of WM1 and $V_C$. The supply voltage $V_C$ is also applied to cascaded inverters 121, 123 and 125. Pin D is also connected to the input of inverter 121 which, in turn, has its output connected to the input of inverter 123. The output of inverter 123 is then connected to the input of inverter 125. The output of inverter 125 is applied through a 120 kilohm resistor 127 to point 105. A 30 kilohm resistor 129 is connected between point 105 and ground to develop a common output for the sense circuits 101 and 103, as well as to the low temperature sensor 109 (to be explained).

When WM1 is undamaged (not broken or shorted to either $V_C$ or WM2), the input to inverter 121 is high, the output of inverter 123 is low and the output of inverter 125 is high.

Part 3 includes the low temperature sensor 109 (FIG. 9). The low temperature sensor 109 comprises: a negative temperature coefficient (NTC) bridge circuit 131 which includes serially-connected resistors 133 and 134 respectively coupled between $V_C$ and ground, and serially-connected resistors 135 and 136 respectively coupled between $V_C$ and ground; an operational amplifier 137 having its non-inverting input (+) connected to the junction of resistors 133 and 134 and its inverting input (−) connected to the junction of resistors 135 and 136; an inverter 139 for inverting the output of the operational amplifier 137; and a diode coupled between the output of inverter 139 and point 105.

The resistors 133 and 136 may be 800 kilohm resistors, while the resistors 134 and 135 may be 68 kilohm resistors having negative temperature coefficients (NTC). With this implementation the bridge circuit 131 would be unbalanced until the temperature inside the housing 17 reaches approximately −25 degrees C. It can be readily seen that when the bridge circuit 131 is unbalanced, the operational amplifier 137 develops a low output which is inverted by inverter 139 to backbias the diode 141. Therefore, when the temperature inside the housing 17 (FIG. 1) is above −25 degrees centigrade, the low temperature sensor 109 is effectively disconnected by the back-biased diode 141 from the point 105.

Part 4 includes a low voltage detector 107 connected to point 105 for developing a RESET signal when the potential across resistor 129 is below a preselected threshold voltage of, for example, +1.15 volts when $V_C$= +4.5 volts), and a capacitor 145 connected between point 105 and ground for retaining the input potential (voltage developed across resistor 129) to the detector 107 for a sufficient time to enable the detector 107 to generate a RESET signal when the potential across resistor 129 falls below +1.15 volts. The low voltage detector 107 may be a voltage comparator which develops a low output when the voltage across resistor 129 falls below an internal reference potential of +1.15 volts.

Various conditions will now be discussed.

NO ATTEMPT MADE TO GAIN ACCESS TO KSK

When no attempt has been made to freeze and/or penetrate the housing 17 to gain access to the KSK in the resettable memory 79 (FIG. 9) the temperature in the housing 17 (FIG. 1) will be high enough not to trigger the low temperature sensor 109 and both WM1 and WM2 will be undamaged. As a result, the outputs of inverters 113 and 125 will both be high. Therefore, the voltage developed across resistor 129 (approximately +1.5 volts) will be above the 1.15 volt threshold of the low voltage detector 107. Consequently, the low voltage detector 107 will not develop the RESET signal.

ATTEMPTED PENETRATION OF HOUSING 17 BREAKS WM2 OR SHORTS WM2 EITHER TO GROUND OR WM1

When WM2 is broken or shorted either to ground or WM1, pin C goes to a low potential, causing the input to inverter 111 to go low. This low input is inverted to a high signal by inverter 111. The high signal (+4.5 volts) from inverter 111 is inverted by inverter 113 to a low signal (0 volts). Assume that WM1 is not broken at this time and therefore that inverter 125 develops a high output (+4.5 volts). As a result, a voltage divider comprised of resistors 117, 127 and 129 will cause point 105 to fall to approximately +0.9 volts. Since +0.9 volts is below the +1.15 volt threshold of the low voltage detector 107, the low voltage detector 107 will develop the RESET signal to actively reset memory 79 (FIG. 9).

ATTEMPTED PENETRATION OF HOUSING 17 BREAKS WM1 OR SHORTS WM1 EITHER TO $V_C$ OR WM2

When WM1 is broken or shorted either to $V_C$ or WM2, pin D goes high (+4.5V). This high signal is inverted by inverter 121. The low signal (0 volts) from inverter 121 is inverted by inverter 123. The high signal from inverter 123 is inverted by inverter 125. Assume that WM2 is not broken at this time and therefore that inverter 113 develops a high output (+4.5 volts). As a result, the voltage divider comprised of resistors 117, 127 and 129 will cause point 105 to fall to approximately +0.9 volts. This will then cause the low voltage detector 107 to develop the RESET signal to reset memory 79 (FIG. 9).

If both WM1 and WM2 are broken, the inverters 113 and 125 will both go low, causing the charge across capacitor 145 to fall toward 0 volts. However, as soon as the voltage across capacitor 145 falls below +1.15 volts, the low voltage detector 107 will generate the RESET signal.

$V_C$ FALLS BELOW +3.5 VOLTS

If $V_C$ falls below +3.5 volts, the voltage across capacitor 145 will fall below +1.15 volts. This again will cause the low voltage detector 107 to generate the RESET signal.

TEMPERATURE IN HOUSING 17 FALLS BELOW −25 DEGREES CENTIGRADE

When the temperature in the housing falls below −25 degrees centigrade, the bridge circuit 131 in the low temperature sensor 109 becomes either balanced or unbalanced in the opposite direction. In either event, the operational amplifier 137 develops a high output which is inverted by inverter 139. The low output (0 volts) from inverter 139 forward biases diode 141 causing point 105 to fall toward 0 volts. This will cause the charge across capacitor 145 to fall toward 0 volts. However, as soon as the voltage across capacitor 145 falls below +1.15 volts, the low voltage detector 107 generates the RESET signal to clear the memory 79.

The invention thus provides a security device 11 for the secure storage of sensitive data. It provides protection for the device 11 against chemical attack, physical attack, and tampering at extremely low temperature. The ceramic housing cannot be penetrated by chemicals, since ceramics will not dissolve. Physical attack by cutting or drilling will result in the ceramic housing 17 cracking or breaking, thus breaking or damaging at least one of the two conductive paths WM1 and WM2. This will cause the tamper detection circuitry 69 to actively reset the resettable memory 79 to destroy the sensitive data stored therein. Similarly, any attempt to tamper with the security device 11 at an extremely low temperature will also cause the tamper detection circuitry 69 to actively reset the memory 79.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

I claim:

1. A device for the secure storage of sensitive data, said device comprising:
    a housing;
    a memory contained within said housing for storing sensitive data therein;
    low temperature sensing means contained within said housing and being responsive to a decrease in temperature in said housing below a preselected reference temperature for developing a first signal; and
    means contained within said housing being responsive to said first signal for clearing said memory of any sensitive data stored therein.

2. The device of claim 1 wherein said low temperature sensing means includes:
    a temperature sensitive bridge circuit for producing a first operational state when the temperature within said housing is at or above a preselected reference temperature and a second operational state when the temperature within said housing is below said preselected reference temperature; and amplifier means responsive to said second operational state of said temperature sensitive bridge circuit for developing said first signal.

3. The device of claim 1 wherein said housing is comprised of a plurality of individual parts selectively connected together, each of said individual parts being comprised of a ceramic substrate and a plurality of ceramic layers disposed thereon, said device further including:
a first conductive path selectively provided through said plurality of ceramic layers of each of said plurality of individual parts; and
sensing means contained within said housing and being coupled to said first conductive path, said sensing means being responsive to any attempt to penetrate said housing which damages said first conductive path for generating a second signal;
said clearing means being responsive to said first signal or said second signal for clearing said memory of any sensitive data stored therein.

4. The device of claim 3 further including:
a second conductive path selectively provided through said plurality of ceramic layers of each of said plurality of individual parts, said sensing means further coupled to said second conductive path and being responsive to any attempt to penetrate said housing which damages said second conductive path for generating a third signal, said clearing means being responsive to any of said first, second or third signals for applying a fourth signal to said memory to clear said memory of any sensitive data stored therein.

5. The device of claim 4 wherein said memory includes:
a resettable shift register which is reset by said fourth signal to clear any sensitive data stored therein.

6. The device of claim 4 wherein said low temperature sensing means includes:
a temperature sensitive bridge circuit for producing a first operational state when the temperature within said housing is at or above a preselected reference temperature and a second operational state when the temperature within said housing is below said preselected reference temperature; and amplifier means responsive to said second operational state of said temperature sensitive bridge circuit for developing said first signal.

7. A device for the secure storage of sensitive data, said device comprising:
a housing comprised of a plurality of individual parts selectively connected together, each of said parts being comprised of a substrate and a plurality of layers disposed thereon; and
electronic circuitry contained within said housing, said electronic circuitry including a memory for storing sensitive data therein and tamper detection circuit, said tamper detection circuit including a first conductive path selectively provided through said plurality of layers of each of said plurality of individual parts, said tamper detection circuit being responsive to any attempt to penetrate said housing which damages said first conductive path for clearing said memory of any sensitive data stored therein;
said tamper detection circuit further including: sensing means coupled to said first conductive path and being responsive to damage to said first conductive path for generating a first signal; means responsive to said first signal from said sensing means for clearing said memory of any sensitive data stored therein; and low temperature sensing means responsive to a decrease in temperature within said housing below a preselected reference temperature for developing a second signal, said clearing means being responsive to said first signal or said second signal for applying a third signal to said memory to clear said memory of any sensitive data stored therein.

8. The device of claim 7 wherein said memory includes:
a resettable shift register which is reset by said third signal to clear any sensitive data stored therein.

9. The device of claim 7 wherein said low temperature sensing means includes:
a temperature sensitive bridge circuit for producing a first operational state when the temperature within said housing is at or above a preselected reference temperature and a second operational state when the temperature within said housing is below said preselected reference temperature; and
amplifier means responsive to said second operational state of said temperature sensitive bridge circuit for developing said second signal.

10. The device of claim 9 wherein said memory includes:
a resettable shift register which is reset by said third signal to clear any sensitive data stored therein.

11. A device for the secure storage of sensitive data, said device comprising:
a housing comprised of a plurality of individual parts selectively connected together, each of said parts being comprised of a substrate and a plurality of layers disposed thereon; and
electronic circuitry contained within said housing, said electronic circuitry including a memory for storing sensitive data therein and a tamper detection circuit, said tamper detection circuit including a first conductive path selectively provided through said plurality of layers of each of said plurality of individual parts, said tamper detection circuit being responsive to any attempt to penetrate said housing which damages said first conductive path for clearing said memory of any sensitive data stored therein; said tamper detection circuit further including: a second conductive path selectively provided through said plurality of layers of each of said plurality of individual parts, said tamper detection circuit being responsive to any attempt to penetrate said housing which damages either of said first and second conductive paths for clearing said memory of any sensitive data stored therein; a first sensing circuit coupled to said first conductive path and being responsive to damage to said first conductive path for generating a first signal; a second sensing circuit coupled to said second conductive path and being responsive to damage to said second conductive path for generating a second signal; clearing means responsive to said first signal or said second signal for applying a third signal to said memory to clear any sensitive data stored therein; and a third sensing circuit responsive to a decrease in temperature in said housing below a preselected reference temperature for developing a fourth signal, said clearing means being responsive to any of said first, second and fourth signals for applying said third signal to said memory to clear said memory of any sensitive data stored therein.

12. The device of claim 11 wherein said memory includes:
a resettable shift register which reset by said third signal to clear any sensitive data stored therein.

13. The device of claim 11 wherein said third sensing circuit includes:
a temperature sensitive bridge circuit for producing a first operational state when the temperature within said housing is at or above a preselected reference temperature and a second operational state when the temperature within said housing is below said preselected reference temperature; and
amplifier means responsive to said second operational state of said temperature sensitive bridge circuit for developing said fourth signal.

14. The device of claim 13 wherein said memory includes:
a resettable shift register which is reset by said third signal to clear any sensitive data stored therein.

15. A device for the secure storage of sensitive data, said device comprising:
a housing comprised of a plurality of individual parts selectively connected together into a preselected configuration, each of said parts being comprised of a substrate and a plurality of layers disposed thereon;
a memory contained within said housing for storing sensitive data therein;
a first conductive path selectively provided through said plurality of layers of each of said plurality of individual parts;
sensing means contained within said housing and being coupled to said first conductive path, said sensing means being responsive to any attempt to penetrate said housing which damages said first conductive path for generating a first signal; means contained within said housing being responsive to said first signal for clearing said memory of any sensitive data stored therein; and low temperature sensing means contained within said housing and being responsive to a decrease in temperature in said housing below a preselected reference temperature for developing a second signal, said clearing means being responsive to said first signal or said second signal for applying a third signal to said memory to clear said memory of any sensitive data stored therein.

16. A device for the secure storage of sensitive data, said device comprising:
a housing comprised of a plurality of individual parts selectively connected together into a preselected configuration, each of said parts being comprised of a substrate and a plurality of layers disposed thereon;
a memory contained within said housing for storing sensitive data therein;
a first conductive path selectively provided through said plurality of layers of each of said plurality of individual parts;
sensing means contained within said housing and being coupled to said first conductive path, said sensing means being responsive to any attempt to penetrate said housing which damages said first conductive path for generating a first signal; means contained within said housing being responsive to said first signal for clearing said memory of any sensitive data stored therein; and
a second conductive path selectively provided through said plurality of layers of each of said plurality of individual parts, said sensing means further coupled to said second conductive path and being responsive to any attempt to penetrate said housing which damages said second conductive path for generating a second signal, said clearing means being responsive to said first signal or said second signal for clearing said memory of any sensitive data stored therein.

17. The device of claim 16 wherein said sensing means includes:
a first sensing circuit coupled to said first conductive path and being responsive to damage to said first conductive path for generating said first signal; and
a second sensing circuit coupled to said second conductive path and being responsive to damage to said second conductive path for generating said second signal.

18. The device of claim 17 further including:
a third sensing circuit contained within said ceramic housing being responsive to a decrease in temperature in said ceramic housing below a preselected reference temperature for developing a third signal, said clearing means being responsive to any of said first, second and third signals for applying a fourth signal to said memory to clear said memory of any sensitive data stored therein.

* * * * *